United States Patent [19]

Berman et al.

[11] Patent Number: 4,587,904
[45] Date of Patent: May 13, 1986

[54] DEBRIS FREE PLUG ASSEMBLY FOR HEAT EXCHANGE TUBES

[75] Inventors: Irwin Berman, Montclair; Joseph F. Sheehan, Clark, both of N.J.

[73] Assignee: Foster Wheeler Energy Corporation, Livingston, N.J.

[21] Appl. No.: 689,429

[22] Filed: Jan. 7, 1985

[51] Int. Cl.$^4$ .............................................. F42B 3/00
[52] U.S. Cl. .................................. 102/333; 102/304; 138/89; 165/76; 228/2.5; 228/107
[58] Field of Search ................. 102/304, 333; 228/2.5, 228/107; 138/89; 165/76

[56] References Cited

U.S. PATENT DOCUMENTS

| | | | |
|---|---|---|---|
| 1,787,910 | 1/1931 | Lanier, Jr. | 102/304 |
| 1,826,150 | 10/1931 | Ormsby | 102/304 |
| 1,832,132 | 11/1931 | Lanier, Jr. et al. | 102/304 |
| 3,364,562 | 1/1968 | Armstrong | 228/107 |
| 3,590,877 | 9/1968 | Leopold | 138/89 |
| 3,698,067 | 10/1972 | Feiss | 228/107 |
| 3,724,062 | 4/1973 | Cantrell et al. | 138/89 X |
| 3,751,954 | 8/1973 | Ezra et al. | 72/56 |
| 3,912,148 | 10/1975 | Johnson | 228/107 X |
| 3,993,001 | 11/1976 | Hawes | 102/304 |
| 4,028,789 | 6/1977 | Loch | 228/2.5 X |
| 4,106,687 | 8/1978 | Bement | 228/2.5 |
| 4,117,966 | 10/1978 | Green et al. | 228/2.5 |
| 4,158,370 | 6/1979 | Larson | 138/89 |
| 4,205,422 | 6/1980 | Hardwick | 29/402.13 |
| 4,347,790 | 9/1982 | Lizen | 102/304 |
| 4,352,379 | 10/1982 | Larson | 138/89 X |
| 4,425,944 | 1/1984 | Heuckelback et al. | 138/89 |
| 4,513,786 | 4/1985 | Sodergren et al. | 165/76 X |
| 4,513,903 | 4/1985 | Feldstein et al. | 228/2.5 X |

FOREIGN PATENT DOCUMENTS 952743 8/1974 Canada ............................ 228/2.5

*Primary Examiner*—Peter A. Nelson
*Attorney, Agent, or Firm*—Marvin A. Naigur; John E. Wilson; Warren B. Kice

[57] ABSTRACT

An explosive activated assembly for repairing a heat exchange tube in which a grooved metal casing is inserted into the tube to be repaired and has a plurality of projections extending from the outer surface thereof. A force-transmitting member extends within a bore formed in the casing and contains an explosive member so that, upon detonation of the explosive member, the force-transmitting member and the casing are expanded radially outwardly to drive the projections against the tube. A booster is located within the casing and adjacent the charge and is activated by a transfer cord connected to an externally located detonator. The casing is formed with an extension that extends over a portion of the transfer cord and has a hole through which the cord extends to contain the debris and vapor caused by the explosion.

11 Claims, 3 Drawing Figures

DEBRIS FREE PLUG ASSEMBLY FOR HEAT EXCHANGE TUBES

BACKGROUND OF THE INVENTION

This invention relates to an assembly for plugging a heat exchange tube and, more particularly, to such an assembly utilizing an explosively activated casing.

Many current designs of heat exchangers feature the use of a large plurality of heat exchange tubes supported by a tube sheet and adapted to receive primary fluid which is passed in a heat exchange relationship with a secondary fluid flowing over the tubes. During the lifetime of such a heat exchanger, a number of heat exchange tubes often fail due to erosion, corrosion, intergranular attack, and other causes. This could allow the normally separated fluids to come into direct contact with each other and thus diminish the efficiency of the heat exchanger.

The most simple manner of dealing with these types of failures is to disable the particular heat exchange tube by closing it off at both ends in the vicinity of the tube sheet or sheets. This has been done in the past, for example, by welding plugs in the respective ends of the tubes. However, this requires relatively good access to the tubes and results in a weld bead that could become corroded and fail. Mechanically driven plugs have been used, but these are also not without problems since they are difficult to install with any consistency and have a relatively low pullout strength.

Another method of plugging that has been used is to explosively form a tubular plug to the inner wall of the tube by setting off an explosive within the plug to seal it in the tube. This technique is relatively simple and inexpensive, is very effective and does not disturb the integrity of adjacent tubes. However, when the explosive is set off, some debris and polyethylene vapor can easily be deposited on the exposed surfaces. In most applications the debris can easily be cleaned with a wire brush or felt pellets. However, in a nuclear heat exchanger cleaning the debris and polyethylene vapor results in possible exposure to radiation.

SUMMARY OF THE INVENTION

It is therefore an object of the present invention to provide an explosively activated plug assembly for a heat exchange tube.

It is a further object of the present invention to provide a plug assembly of the above type which utilizes a sleeve which is explosively activated into engagement with the heat exchange tube.

It is a further object of the present invention to provide a plug assembly of the above type in which the sleeve is grooved to form a pressure-tight seal. It is a still further object of the present invention to provide a plug assembly of the above type in which the debris and polyethylene vapor resulting from the explosion are contained within the assembly.

Toward the fulfillment of these and other objects, the plug assembly of the present invention includes a casing disposed within the tube to be plugged and having an internal bore and an outer diameter slightly less than the inner diameter of the tube. A force-transmitting member extends within the bore and an explosive is disposed within the force-transmitting member. A transfer cord extends between a detonator and a booster disposed adjacent the explosive, and an extension of the casing extends over a portion of the cord and has a hole in its end through which the cord extends. Upon detonation of the explosive, the force-transmitting member is expanded radially outwardly against the sleeve to expand the sleeve radially outwardly and drive the projections into the tube, while the debris and polyethylene vapor from the explosion are confined within the casing and its extension.

DESCRIPTION OF THE INVENTION

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED INVENTION

Figure 1:
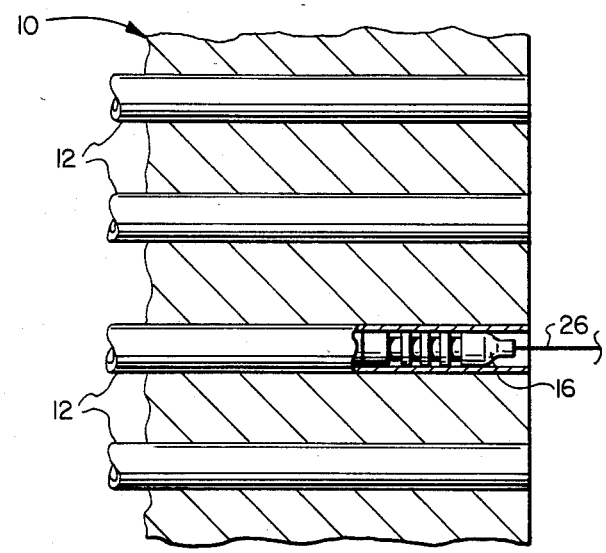
FIG. 1 is a partial fragmentary, front elevational view of a plurality of heat exchange tubes supported by a tube sheet of a typical heat exchange apparatus and depicting the plug assembly of the present invention in one of the tubes.

Referring to FIG. 1 of the drawings, the reference numeral 10 refers in general to a tube sheet which can form a portion of a heat exchanger having a plurality of heat exchange tubes 12. The ends of the tubes 12 shown in the drawings are mounted to one side of the tube sheet 10 and extend through bores in the tube sheet in communication with the area extending to the other side of the tube sheet. Only a portion of the tube sheet 10 and the tubes 12 are shown in the interest of clarity, it being understood that the heat exchanger would also include a vessel enclosing the tube sheet and having suitable inlets and outlets for a primary heat exchange fluid and a secondary heat exchange fluid. According to a typical arrangement of this type, the tubes would be U-shaped with both ends of each tube extending through the tube sheet 10. The heat exchanger would include a partition, or the like, so that the primary heat exchange fluid enters the tubes, passes through the tubes in a heat exchange relation with the secondary fluid passing through the vessel, and exits through the other ends of the tubes.

Figure 2:
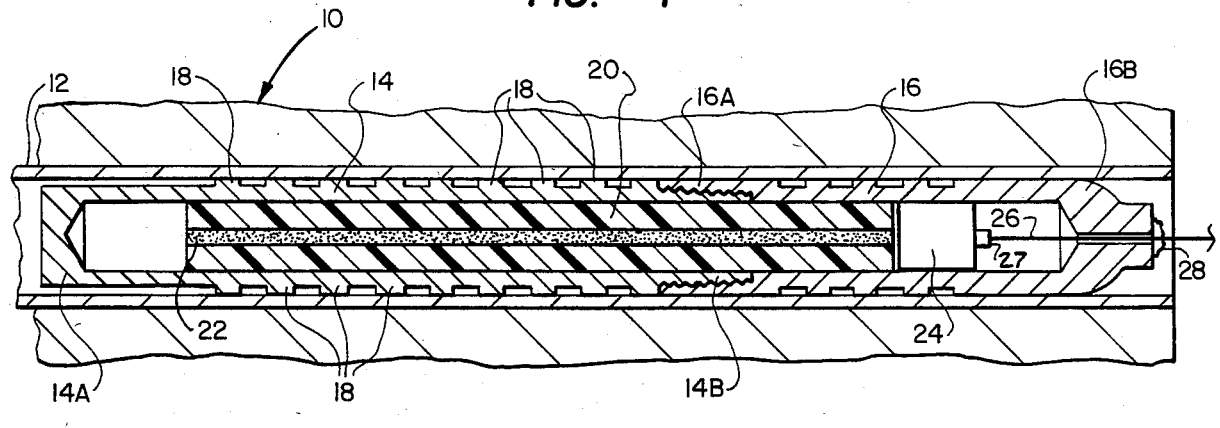
FIG. 2 is an enlarged, partial, longitudinal sectional view taken along the tube of FIG. 1, and having the plug assembly of the present invention inserted therein.

The assembly of the present invention is shown inserted into a damaged tube 12 and is better shown in FIG. 2. The assembly includes a casing 14 extending into the end of the tube 12. The length of the casing 14 is selected so that it will contact some of the undamaged inner surface of the tube 12. If necessary, the damaged portion of the inner tube surface is initially removed so that a relatively smooth surface is available for contact with the casing 14. This may require total elimination of a portion of the tube in which case the casing would be disposed directly within the bore of the tube sheet 10.

The casing 14 has a closed end 14A and an open end 14B. An extension 16 has an open end 16A in threaded engagement with the open end 14B of the casing 14, and a closed end 16B that is shown extending flush with the tube sheet 10 but can be either inside or outside of the bore of the tube sheet. The casing 14 and extension 16 are fabricated from a suitable metal which can be carbon steel or an alloy such as monel.

A plurality of spaced circular projections 18 are formed on the outer surface of the casing 14 and the extension 16. Preferably, the projections 18 are formed as a result of a plurality of circumferential, axially spaced annular grooves being machined into the outer surface of the casing 14 and the extension 16. The projections 18 extend for substantially the entire length of the casing 14 and for approximately half the length of the extension 16, it being understood that the number of the projections is selected in conjunction with the length of the casing 14 to insure that at least a portion of the projections will contact an undamaged portion of the inner surface of the tube 12.

A cylindrical force-transmitting member 20, which can be fabricated from a thermoplastic hardenable resin of a conventional composition, is disposed within the bore of the casing 14 and extends for substantially the length of the casing and for a portion of the extension 16. The member 20 has an axially extending central bore which receives a cordlike explosive member 22 extending for the entire length of the member 20. The explosive member 22 contains a predetermined number of grains of explosive uniformly disposed along the axis of the member and embedded within a fiber or plastic body. A booster 24 is disposed in the bore of the extension 16 and extends in a closely spaced relation to the corresponding end of the member 22. A non-exploding, energy transfer cord 26 is connected at one end to a flange 27 extending from the booster 24 and at its other end to a detonator cap (not shown) which contains a very sensitive primary explosive which detonates readily when set off in any conventional manner. The energy transfer cord 26 extends through a small bore formed in the end 16B of the extension 16 which is sealed by a sealing agent 28.

The booster 24 is detonated by the energy transfer cord 26 and, in turn, detonates the explosive member 22 to effect the expansion of the tube 12 in the manner described below. The booster 24 is necessary due to the use of the nonexploding energy transfer cord 26 which, by itself, is not capable of detonating the explosive member 22.

Upon detonation of the explosive member 22 in the manner described above, the shock wave of the detonation is transmitted in a radial direction, via the force transmitting member 20, to the casing 14 and the extension 16, forcing both, and therefore the projections 18, against the inner wall of the tube 12. Due to the very high pressure which acts for a very short time, the casing 14 and the extension 16 are expanded to a diameter greater than the inner diameter of the tube 12. As a result, the projections 18 coin, or emboss, into the inner surface of the tube and function to plug the tube while disrupting possible leak paths. The extension 16 contains the debris and gases resulting from detention of the explosive 22 and the booster 24, while the threaded connection between the casing 14 and the extension 16 eliminates the need for arc welding in the vicinity of the explosives.

As a non-limitive example of the dimensions and spacing of the projections 18 formed on the sleeve 14 according to the present invention, the projections 18 can have an axial length (measured in a direction parallel to the axis of the sleeve) of approximately 0.06 inches, and a thickness (corresponding to the depth of the corresponding groove) of 0.02 inches. The spacing between the projections is equal to their axial length (0.06 inches) and, after the explosion, the projections emboss into the inner tube surface for a distance of approximately 0.002 inches.

Figure 3:
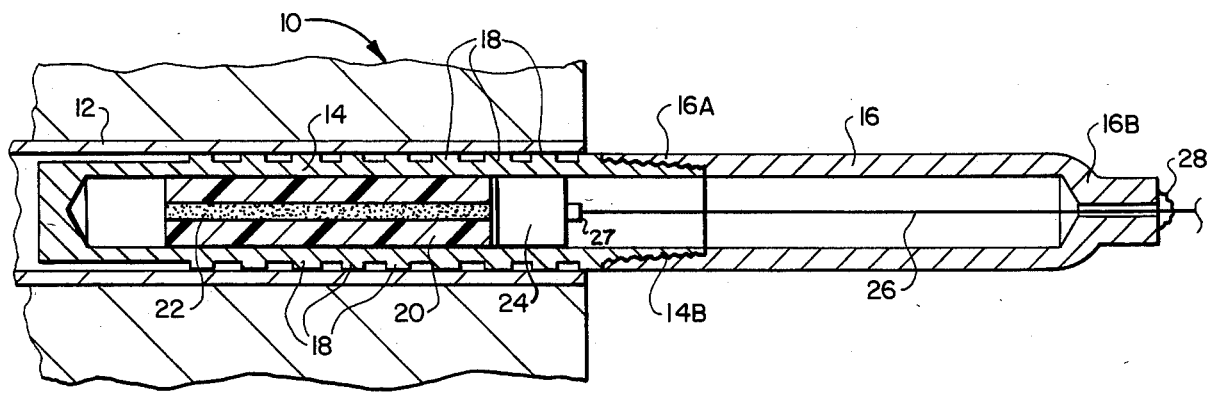
FIG. 3 is a view similar to FIG. 2, but depicting an alternate embodiment of the present invention.

The embodiment of FIG. 3 differs from that of FIG. 2 only in the size and location of the various components, which will be referred to by the same reference numerals.

According to the embodiment of FIG. 3 the extension 16 projects outwardly from the corresponding surface of the tube sheet 10, and the booster 24 is disposed slightly inwardly from the latter surface. The projections 18 are formed on the casing 14 only, and the explosive 22 and the force transmitting member 20 extend substantially coextensive with the casing 14. Otherwise, the assembly of FIG. 3 is identical to that of FIGS. 1 & 2.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed is:

1. An explosively activated assembly for repairing a tube, said apparatus comprising a casing assembly disposed within said tube and having an internal bore and an outer diameter slightly less than the inner diameter of said tube, a force transmitting member extending within said bore, explosive means extending within said force transmitting member, booster means extending within said casing assembly for igniting said explosive means, and an energy transfer cord extending from said booster means; said casing assembly comprising first and second casing members each having a closed end and an open end, said casing members being connected together at their open ends to define an enclosed chamber, one of said casing members having a bore extending through its closed end for receiving, in a relatively close fit, said energy transfer cord, said energy transfer cord projecting from said closed end of said one casing member and adapted to connect said booster means to externally located detonator means for igniting said booster means and therefore said explosive means, so that said force transmitting member is expanded radially outwardly against said casing to expand said casing radially outwardly against the inner surface of said tube and plug said tube, said chamber containing the debris and gases resulting from detonation of said explosive means and said booster means.

2. The assembly of claim 1 further comprising a plurality of projections extending from the outer surface of said casing assembly and adapted to extend in close proximity to the inner surface of said tube, said projections overlapping said explosive means so that, upon detonation of said explosive means, they are driven into the inner surface of said tube.

3. The assembly of claim 2 wherein said projections extend for a substantial portion of the entire length of said casing assembly.

4. The assembly of claim 1 wherein said booster means contains an explosive which is detonatable by said energy transfer cord and, upon ignition, is sufficient to detonate said explosive means.

5. The assembly of claim 4 wherein said energy transfer cord is insufficient to detonate said explosive means but sufficient to detonate said booster means.

6. The assembly of claim 1 further comprising means for sealing said closed end of said one casing member through which said cord extends.

7. The assembly of claim 1 wherein said open ends of said casing member are connected by means of threads formed on said ends.

8. The assembly of claim 1 wherein said both of said casing members extend within said tube.

9. The assembly of claim 8 where said force transmitting member and said explosive means extend for substantially the entire length of the other casing member and for a portion of the length of said one casing member.

10. The assembly of claim 8 where said projections extend for substantially the entire length of the other casing member and for a portion of the length of said one casing member.

11. The assembly of claim 1 wherein said one casing member projects outwardly from said tube.

* * * * *